(12) United States Patent
Sahm

(10) Patent No.: US 7,900,954 B2
(45) Date of Patent: Mar. 8, 2011

(54) LATCHING DEVICE FOR FIXING AN AIRBAG

(75) Inventor: Norbert Sahm, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/320,294

(22) Filed: Jan. 22, 2009

(65) Prior Publication Data

US 2009/0194977 A1    Aug. 6, 2009

Related U.S. Application Data

(63) Continuation of application No. PCT/EP2007/056406, filed on Jun. 27, 2007.

(30) Foreign Application Priority Data

Jul. 24, 2006   (DE) .......................... 10 2006 034 740

(51) Int. Cl.
    *B60R 21/16* (2006.01)
(52) U.S. Cl. ..................................................... 280/728.2
(58) Field of Classification Search ............... 280/728.1, 280/728.2, 743.1
    See application file for complete search history.

(56) References Cited

U.S. PATENT DOCUMENTS

| 5,454,588 A * | 10/1995 | Rose ........................... 280/728.2 |
| 5,556,124 A | 9/1996 | Olson |
| 5,692,768 A | 12/1997 | Mihm et al. |
| 5,735,542 A | 4/1998 | Bohn |
| 5,813,707 A | 9/1998 | Bohn |
| 6,056,313 A | 5/2000 | Lutz et al. |
| 6,283,497 B1 | 9/2001 | Zimmerbeutel et al. |
| 7,040,647 B2 | 5/2006 | Deligny et al. |
| 2004/0100071 A1 | 5/2004 | Chavez et al. |
| 2007/0108752 A1 | 5/2007 | Eckert et al. |
| 2008/0007037 A1 | 1/2008 | Sauer |
| 2008/0023944 A1 * | 1/2008 | Dargavell et al. .......... 280/728.2 |

FOREIGN PATENT DOCUMENTS

| DE | 42 33 751 A1 | 4/1994 |
| DE | 42 93 648 B4 | 4/1995 |
| DE | 195 38 870 C2 | 4/1997 |
| DE | 298 13 911 U1 | 11/1998 |
| DE | 198 50 463 A1 | 5/2000 |
| DE | 10056835 A1 | 6/2001 |
| DE | 20 2004 020 096 U1 | 3/2005 |
| DE | 20 2005 009 002 U1 | 8/2005 |

(Continued)

OTHER PUBLICATIONS

Examination Report mailed Nov. 4, 2009, received in German Application No. 10 2006 034 740.4-56.

*Primary Examiner* — Eric Culbreth
(74) *Attorney, Agent, or Firm* — Foley & Lardner LLP

(57) ABSTRACT

A device for fixing an airbag which is fastened to a holding frame in a housing of a front passenger airbag module by means of at least one clamping element arranged separately from the holding frame. The housing and the clamping element are non-deformable in the region of the holding frame. The clamping element is free from screw or rivet connections and is dimensioned so that it is spaced from the holding frame when being introduced into the clamping position by a distance which is greater than the thickness of an optionally provided protective film for the airbag. The clamping element is fixed in its clamping position at a distance from the holding frame.

11 Claims, 4 Drawing Sheets

FOREIGN PATENT DOCUMENTS

| | | |
|---|---|---|
| DE | 601 10 621 T2 | 1/2006 |
| EP | 0 769 426 A2 | 4/1997 |
| EP | 0 876 942 A2 | 11/1998 |
| GB | 2 323 572 A | 9/1998 |
| JP | 6-219229 A | 8/1994 |
| WO | WO 00/06425 | 2/2000 |

* cited by examiner

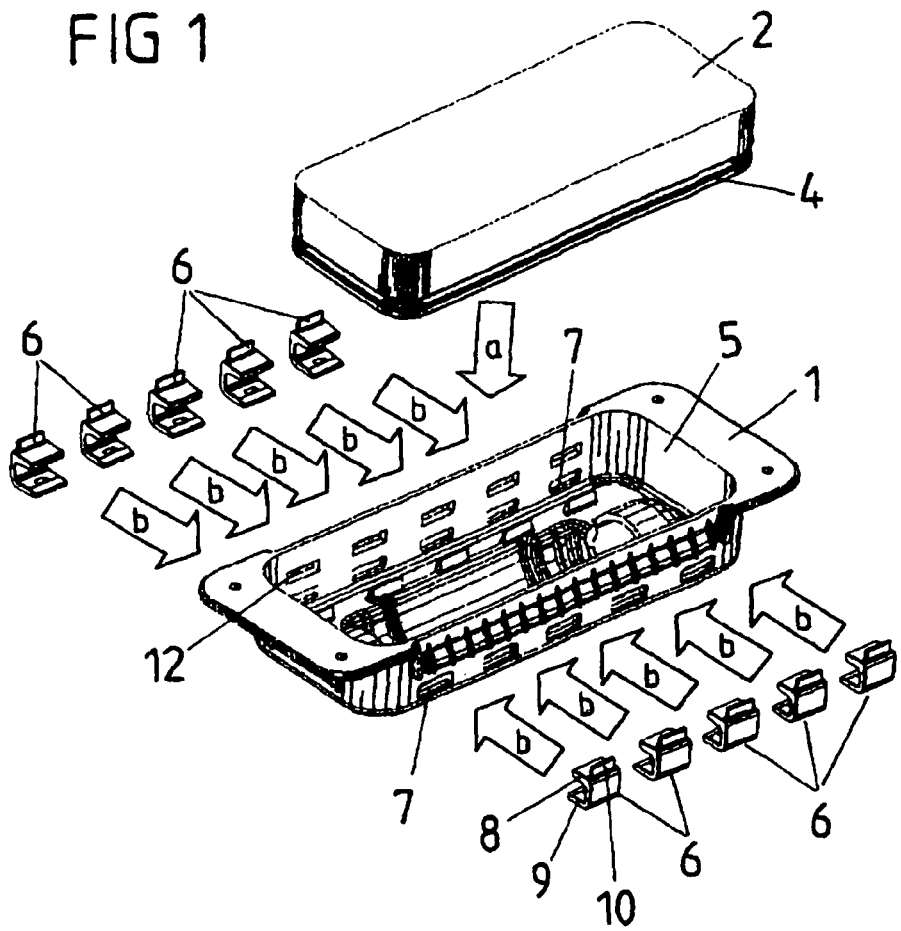
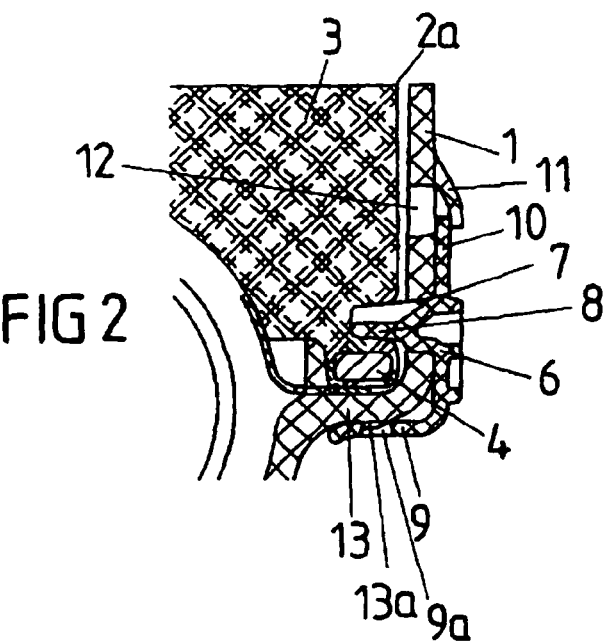

LATCHING DEVICE FOR FIXING AN AIRBAG

CROSS-REFERENCE TO RELATED PATENT APPLICATIONS

This application is a Continuation of International Patent Application No. PCT/EP2007/056406, filed Jun. 27, 2007, which was published in German as WO/2008/012156 and is incorporated herein by reference in its entirety.

BACKGROUND

This application relates to a device for fixing an airbag, which is fastened to a holding frame, in a housing of a front passenger airbag module.

Various solutions are known for fixing an airbag which is fastened to a holding frame in a housing of an airbag module. For example, an airbag module is known from DE 198 50 463 A1 (incorporated by reference herein) in which an airbag is connected to a holding frame which has locking elements to fix the holding frame, and therefore the airbag, in the housing. This airbag module has the disadvantage that welding of the folded airbag into a flexible protective cover enclosing the airbag packet is made more difficult because of the locking elements. The gastight enclosure makes it possible to minimize the dimensions of the airbag packet by generating a low pressure in the flexible protective cover. A further disadvantage is that the housing must have a double-walled configuration in the locking region.

In the airbag module known from the application GB 2 323 572 A the holding frame of the airbag has locking elements in the form of latching hooks that engage in openings of the airbag housing. In this arrangement, too, there is the disadvantage that welding-in of the folded airbag is made more difficult because of the locking elements.

Known from U.S. Pat. No. 5,556,124 (incorporated by reference herein) is an airbag module in which the holding frame of the airbag is held between projections inside the airbag housing. The housing consists of a main part with a U-shaped cross-section and two end parts. The holding frame must be inserted into the housing prior to installation of the end parts since the side walls of the main part must be pressed away from one another by the holding frame as it is inserted into the housing from above in order to position the holding frame between the projections. If the airbag packet is surrounded by a protective cover and the holding frame is also contained in the protective cover, the protective cover can be damaged when pushing away the housing walls. Furthermore, this arrangement has the disadvantage that extensive assembly work is required because of the three-part housing.

Finally, a modular assembly for an airbag arrangement is known from the utility model DE 20 2005 009 002 U1 (incorporated by reference herein), in which the holding frame is retained by fastening mechanisms that extend over the holding frame. In this case, the holding frame is first positioned in the airbag housing. The fastening mechanisms are then inserted and screwed or riveted to the housing. It is further known from this document to fix the holding frame by means of a clamp. In this case the annular clamp, which is split at one point, is spread after fixing of the airbag packet and fitted from outside over the holding frame and a housing base plate. The clamp is then pulled together in the region of the split by a screw and nut. These arrangements have the disadvantage that screwing or riveting operations are required for fixing.

In one embodiment in this document a clamp is provided that connects to one another a housing part which extends over the holding frame and a support plate on which the holding frame is located. This clamp is either under elastic pretension or is plastically deformable. With this embodiment, the protective film over the airbag can be damaged when installing the clamp.

SUMMARY

One disclosed embodiment relates to a device for fixing an airbag which is fastened to a holding frame in a housing of a front passenger airbag module by means of at least one clamping element arranged separately from the holding frame. The housing and the clamping element are non-deformable in the region of the holding frame. The clamping element is free from screw or rivet connections and is dimensioned so that it is spaced from the holding frame when being introduced into the clamping position by a distance which is greater than the thickness of an optionally provided protective film for the airbag. The clamping element is fixed in its clamping position by components provided at a distance from the holding frame.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows an embodiment of the inventive arrangement with external clamping elements.

FIG. 2 shows an enlarged section through a portion of the airbag housing according to FIG. 1 and through a clamping element.

DETAILED DESCRIPTION

Figure 2A:
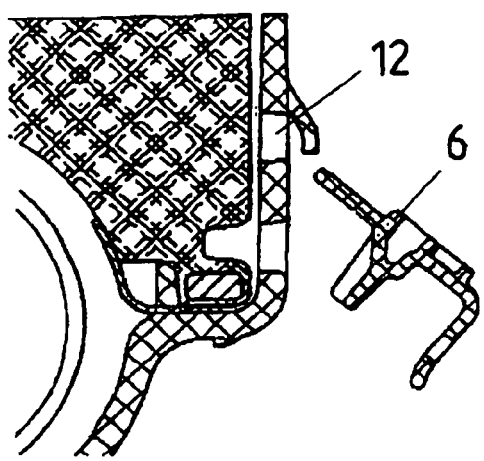
FIGS. 2A-2D show assembly steps for a clamping element of the embodiment of FIGS. 1 and 2.
Figure 2B:
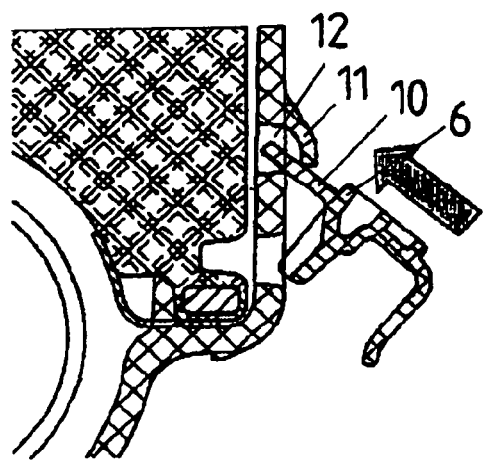
Figure 2C:
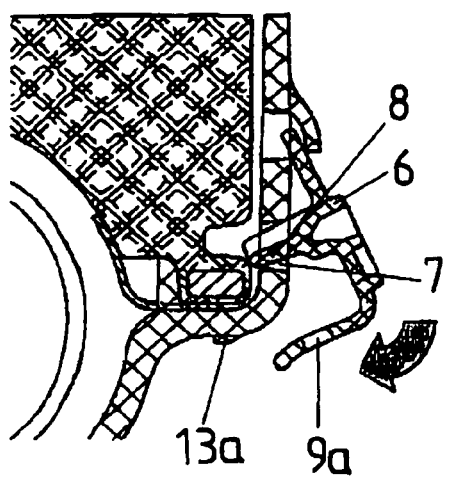

It is the object of at least one disclosed embodiment to fix the holding frame of an airbag in the airbag housing so that the assembly cost is low and that, if the airbag is arranged in the folded state in a flexible protective cover, damage to the protective cover during installation of the airbag is at least very largely prevented.

According to one exemplary embodiment, a device for fixing an airbag is provided. The device is fastened to a holding frame in a housing of a front passenger airbag module by at least one clamping element. The housing and the clamping element are non-deformable in the region of the holding frame. The clamping element is free from screw or rivet connections and is dimensioned such that, when being introduced into the clamping position, it is spaced from the holding frame by a distance which is greater than the thickness of an optionally provided protective film for the airbag. The clamping element is fixed in its clamping position at a distance from the holding frame. Because the clamping element is free from screw or rivet connections, the assembly cost for the clamping element is low. As a result of the distance of the holding elements from the holding frame during introduction of the clamping element to the clamping position, at which time the distance is greater than the thickness of a protective film, the danger of damage to the protective film is at least greatly reduced.

In an embodiment, the clamping element can be fitted over the holding frame from outside through holes in the housing. The clamping element may have at least one latching section for fixing the clamping element in the clamping position at a distance from the holding frame. Each latching section on the clamping element is associated with a corresponding latching section in the housing. In this case, the clamping element is inserted from outside into the housing until it has latched to the latching section provided thereon, in order to fix the holding frame after it has been positioned in the airbag housing.

According to one embodiment the housing has two latching sections for the clamping element, one of which latching sections is located on the side wall of the housing and one latching section is located on the outside of the underside of the housing.

It is advantageous that at least one respective clamping element is provided on opposite sides of the holding frame. Both a plurality of single clamping elements and clamping strips may be provided.

In a further embodiment a two-part housing is provided, each housing part having internal clamping elements. In this case the airbag packet is placed in one housing half in a first step. Half of the airbag packet is retained in the housing half by the clamping elements. A first side of the holding frame is inserted between the clamping elements. In a second step the second housing half is connected to the first housing half. A second side of the holding frame opposite the first side is inserted between the clamping elements of the second housing half.

In this embodiment at least two projections spaced apart opposite one another are preferably provided as clamping elements. The holding frame is therefore retained between these projections after the housing halves have been joined.

It is advantageous that the housing parts are connected by at least one hinge and are connectable to one another at opposite end faces. Both latching elements and screws may be provided as connecting elements at those locations.

Hereinafter, an embodiment of a device for fixing an airbag according to the present invention will be described in detail with reference to attached drawings.

FIG. 1 shows an airbag housing 1 for receiving a tubular gas generator (not shown) and an airbag packet 2. The airbag packet 2 comprises a folded airbag 3 that is connected to a holding frame 4 (FIG. 2) in the region of the injection mouth (not shown) and is surrounded by a protective cover 2a. In a first step a, the airbag packet 2 is inserted in the airbag housing through an opening 5 therein. In a second step b the holding frame 4, and therefore the airbag packet 2, is fixed in the airbag housing 1 by of individual latching clips 6 that engage through holes 7 therein. As can be seen in particular from FIG. 2, the latching clips 6 have a clip portion 8 and latching sections 9 and 10. Associated with the latching section 10 is a latching section 11 on the airbag housing 1. The airbag housing 1 includes holes 12 in the region of the latching section 11. The latching section 9 has a hole 9a, with which a lobe 13a on the outside of the base of the airbag housing 1 is associated.

Figure 2D:
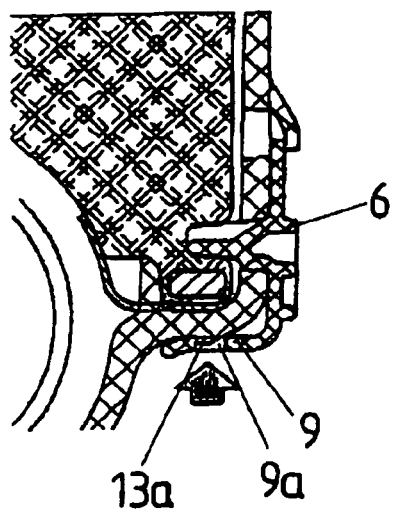

As each latching clip 6 is assembled it is positioned as shown in FIG. 2A in a first step. In a second step, shown in FIG. 2B, the latching section 10 is inserted behind the airbag latching section 11 into the hole 12. Then, in a third step shown in FIG. 2C, the clip section 8 is swiveled through the hole 7. The latching section 9 is then pushed, through further swiveling of the latching clip 6, against the outside of the base of the airbag housing 1, being elastically deformed thereby, until the lobe 13a has latched in the hole 9a, as shown in FIGS. 2 and 2D. In this final position, the clip section 8 extends above the holding frame 4 while the clip section 9 rests against the outside of the base section 13. The latching clip 6, and in particular the clip section 8 located in the region of the holding frame 4, are not deformed during installation.

Figure 3:
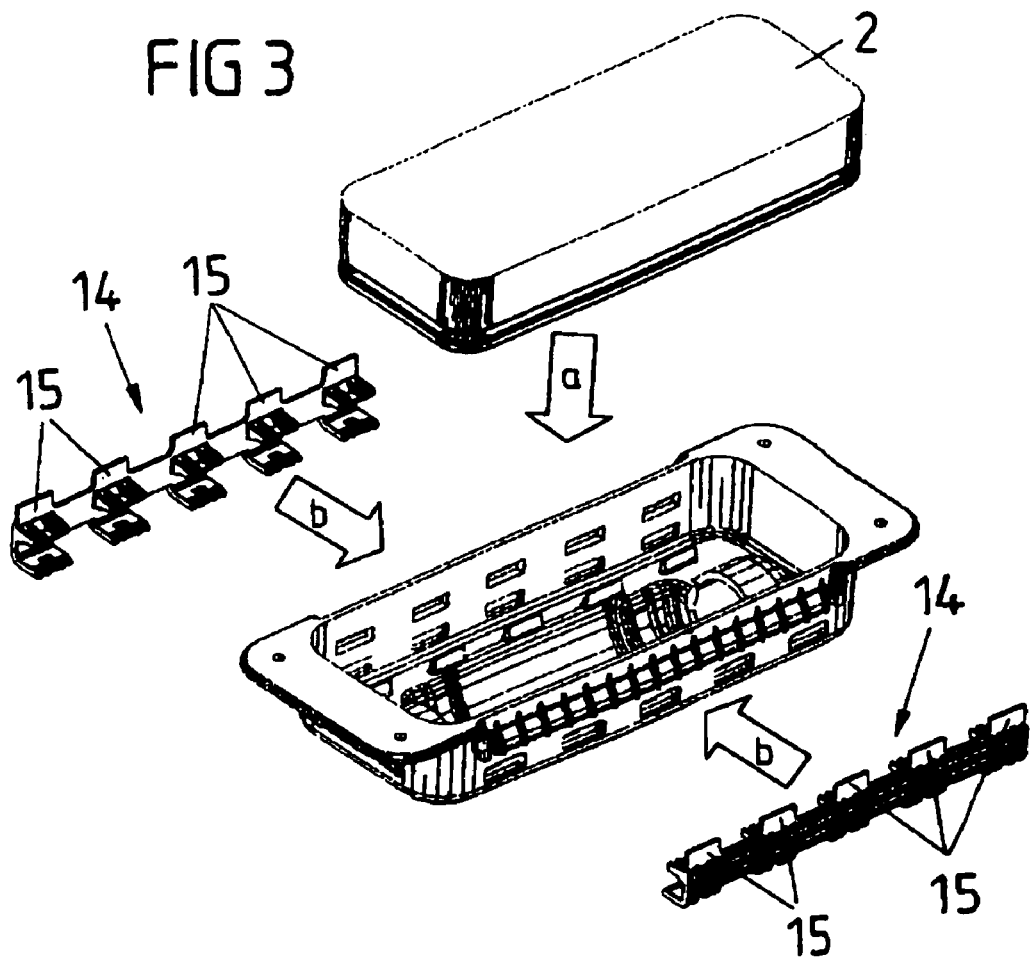
FIG. 3 shows an embodiment with external clamping strips.
Figure 4:
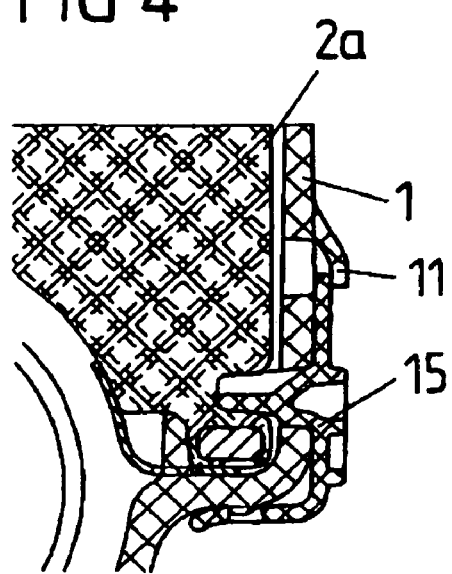
FIG. 4 shows an enlarged section through a portion of the airbag housing according to FIG. 3 and through a clamping element of the clamping strip.

FIGS. 3 and 4 show an embodiment in which clamping strips 14 are provided instead of the individual latching clips 6. Clamping sections 15 of these clamping strips have the same structure as the latching clips 6. Installation of the holding frame 4 takes place in the same way as with the individual latching clips, although the clamping sections 15 of each clamping strip 14 are introduced into the airbag housing 1 simultaneously.

In the embodiments described, the tubular gas generator may be installed before or after installation of the holding frame.

Figure 5:
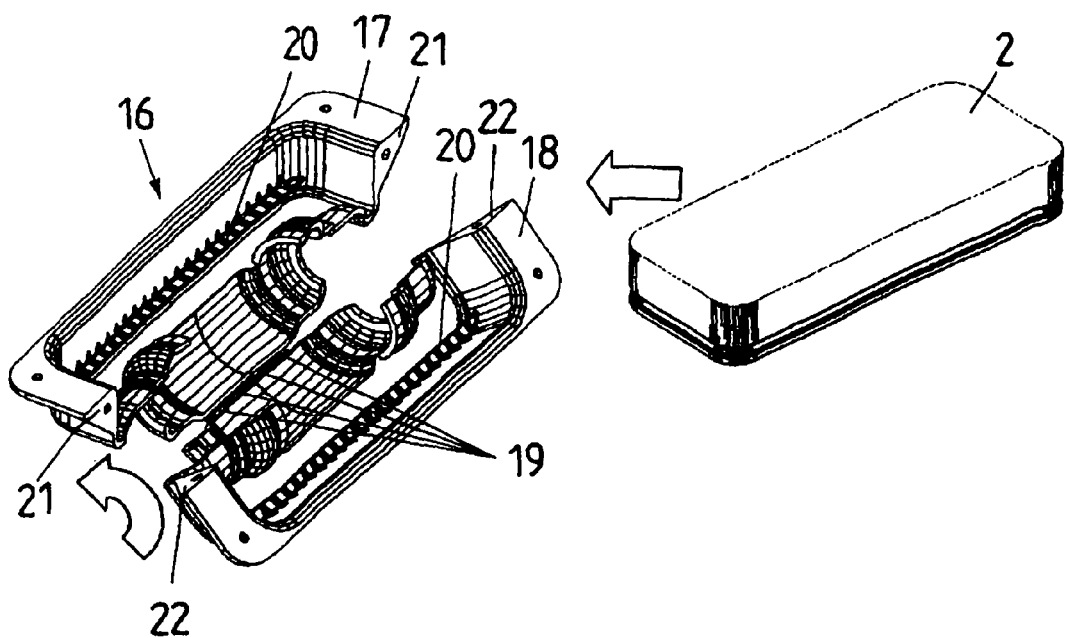
FIG. 5 shows an embodiment with a two-part airbag housing.
Figure 6:
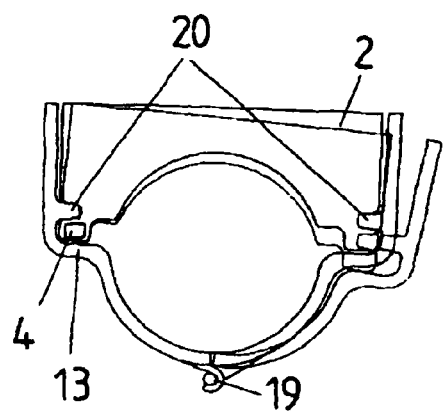
FIG. 6 shows a cross section through the airbag housing of FIG. 5.
Figure 7:
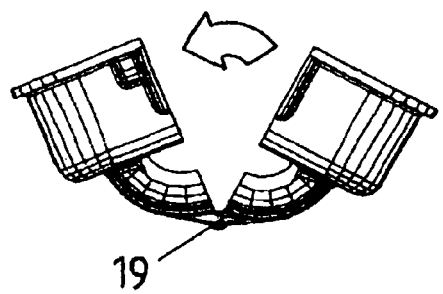
FIG. 7 is a view of the airbag housing according to FIG. 5 from an end face.

In the embodiments of FIGS. 5 to 7, a two-part airbag housing 16 is provided for receiving a tubular gas generator (not shown) and the airbag packet 2. The airbag housing comprises of two housing parts 17 and 18 which are connected to one another by of hinges 19. Each housing part has projections 20 located side-by-side in the direction of the longitudinal axis of the tubular gas generator (not shown).

During assembly, the airbag packet 2 is first placed in one housing part, for example the housing part 17, in a step a. As this happens, half of the airbag packet is retained in the housing part 17 by the projections 20. In a second step b the second housing part 18 is hooked to the hinges 19 and closed by rotation. For permanent closure of the airbag housing 16, the housing parts 17, 18 are connected to one another at their end faces 21 and 22 with latching hooks (elements) 210 or screws 221, which are schematically shown in FIG. 5. As can be seen from FIG. 6, after the airbag housing 16 has been closed the holding frame 4 is clamped between the base section 13 and the projections 20.

According to the above described embodiment, the tubular gas generator is introduced into the airbag housing 16 prior to installation of the airbag packet.

The priority application, German Patent Application No. 10 2006 034 740.4, filed Jul. 24, 2006 including the specification, drawings, claims and abstract, is incorporated herein by reference in its entirety.

What is claimed is:

1. An airbag module, comprising:
a housing;
an airbag arranged in the housing, wherein the airbag is fastened to a holding frame and the airbag and the holding frame are fixed to the housing by at least one clamping element arranged separately from the holding frame; and
a protective film for the airbag,
wherein the housing and the clamping element are non-deformable in a region of the holding frame,
wherein the clamping element is free from screw or rivet connections and is dimensioned so that the clamping element is spaced from the holding frame when being introduced into a clamping position by a distance which is greater than a thickness of the protective film for the airbag, and wherein a clamping element is fixed in a clamping position at a distance from the holding frame, and the clamping element in the clamping position engages through a hole in the housing and extends over the holding frame.

2. The airbag module as claimed in claim 1, wherein the clamping element has at least one latching section for fixing the clamping element in the clamping position at a distance from the holding frame, with which the latching section is associated with at least one latching section of the housing.

3. An airbag module, comprising:
a housing;
an airbag arranged in the housing, wherein the airbag is fastened to a holding frame and the airbag and the holding frame are fixed to the housing by at least one clamping element arranged separately from the holding frame; and
a protective film for the airbag,
wherein the housing and the clamping element are non-deformable in a region of the holding frame,
wherein the clamping element is free from screw or rivet connections and is dimensioned so that the clamping element is spaced from the holding frame when being introduced into a clamping position by a distance which is greater than a thickness of the protective film for the airbag,
wherein a clamping element is fixed in a clamping position at a distance from the holding frame, and the clamping element in the clamping position engages through a hole in the housing and extends over the holding frame,
wherein the clamping element has at least one latching section for fixing the clamping element in the clamping position at a distance from the holding frame, with which the latching section is associated with at least one latching section of the housing, and
wherein the housing has two latching sections for the clamping element, of which a first latching section is located on a side wall of the housing and a second latching section is located on the outside of the underside of the housing.

4. The airbag module as claimed in claim 3, wherein at least one respective clamping element is provided on opposite sides of the holding frame.

5. The airbag module as claimed in claim 4, wherein a plurality of individual clamping elements are provided.

6. The airbag module as claimed in claim 4, wherein clamping strips are provided.

7. An airbag module, comprising:
a housing;
an airbag arranged in the housing, wherein the airbag is fastened to a holding frame and the airbag and the holding frame are fixed to the housing by a plurality of clamping elements arranged separately from the holding frame; and
a protective film for the airbag,
wherein the housing and the plurality of clamping elements are non-deformable in a region of the holding frame,
wherein the plurality of clamping elements is free from screw or rivet connections and is dimensioned so that the plurality of clamping elements is spaced from the holding frame when being introduced into a clamping position by a distance which is greater than a thickness of the protective film for the airbag, and
wherein the plurality of clamping elements is fixed in the clamping position at a distance from the holding frame,
wherein a two-part housing is provided, each housing part including some of the plurality of clamping elements therein, the plurality of clamping elements being provided in a form of projections of the housing parts, and
wherein when the housing is in a closed state, the holding frame of the airbag is clamped between the housing and the projections.

8. The airbag module as claimed in claim 7, wherein at least two projections are located opposite one another at a distance when the housing is in an open state.

9. The airbag module as claimed in claim 8, wherein the housing parts are connected via at least one hinge and are connectable to one another at opposite end faces by connecting elements.

10. The airbag module as claimed in claim 9, wherein latching elements are provided as the connecting elements.

11. The airbag module as claimed in claim 10, wherein screws are provided as the connecting elements.

* * * * *